United States Patent
Cocks et al.

(10) Patent No.: US 9,411,661 B2
(45) Date of Patent: Aug. 9, 2016

(54) DEADLOCK AVOIDANCE

(75) Inventors: Martin W. J. Cocks, Hursley (GB); Dai C. Middleton, Hursley (GB); Colin R. Penfold, Hursley (GB); Helen M. Witter, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 253 days.

(21) Appl. No.: 12/754,854

(22) Filed: Apr. 6, 2010

(65) Prior Publication Data

US 2010/0262972 A1    Oct. 14, 2010

(30) Foreign Application Priority Data

Apr. 8, 2009 (EP) .................................... 09157645

(51) Int. Cl.
*G06F 9/52* (2006.01)
(52) U.S. Cl.
CPC ....................................... *G06F 9/524* (2013.01)
(58) Field of Classification Search
None
See application file for complete search history.

(56) References Cited

U.S. PATENT DOCUMENTS

| | | | | |
|---|---|---|---|---|
| 5,440,743 A * | 8/1995 | Yokota et al. | ................. | 710/200 |
| 5,649,184 A * | 7/1997 | Hayashi et al. | ............... | 711/147 |
| 5,682,537 A * | 10/1997 | Davies et al. | ................. | 710/200 |
| 5,832,484 A * | 11/1998 | Sankaran et al. | | |
| 5,845,117 A | 12/1998 | Fujita | | |
| 5,940,828 A * | 8/1999 | Anaya et al. | | |
| 6,292,488 B1 | 9/2001 | Filgate | | |
| 6,671,686 B2 | 12/2003 | Pardon et al. | | |
| 6,983,461 B2 | 1/2006 | Hutchison et al. | | |
| 7,289,992 B2 | 10/2007 | Walker | | |
| 7,337,290 B2 | 2/2008 | Rajamani et al. | | |
| 2004/0199734 A1 | 10/2004 | Rajamani et al. | | |
| 2006/0206901 A1* | 9/2006 | Chan | ............................ | 718/107 |
| 2007/0233924 A1* | 10/2007 | Chauvet et al. | ................ | 710/240 |
| 2010/0262972 A1* | 10/2010 | Cocks | ..................... | G06F 9/524 |
| | | | | 718/104 |

OTHER PUBLICATIONS

Self-Deadlocks in Disparate Scientific Data Management Systems Fragkiskos Pentaris and Yannis Ioannidis Published: 2004.*
The Performance of Alternative Strategies for Dealing with Deadlocks in Database Management Systems Rakesh Agrawal, Michael J. Carey, and Lawrence W. McVoy Published: 1987.*
Deadlock Detection and Resolution in a CODASYL Based Data Management System Philip P. Macri Proceedings of the 1976 ACM SIGMOD international conference on Management of data; pp. 45-49 Published: 1976.*

(Continued)

*Primary Examiner* — Charles Swift
*Assistant Examiner* — Paul Mills
(74) *Attorney, Agent, or Firm* — Lee Law, PLLC; Christopher B. Lee

(57) ABSTRACT

A transaction processing system is operated. A first resource is locked as a shared resource by a first task executing on a computing device. The first task attempts to lock a second resource as an exclusive resource. The occurrence of a deadlock is ascertained. A second task that wishes to use the locked first resource is identified. A current position of the first task with respect to the first resource is stored. The lock on the first resource is removed. The second task is prompted to use the first resource. The first task locks the first resource as the shared resource. The first task is repositioned with respect to first resource according to the stored position. The first task locks the second resource as the exclusive resource. The first task is performed.

20 Claims, 5 Drawing Sheets

(56) References Cited

OTHER PUBLICATIONS

Deadlock Detection in Distributed Systems Mukesh Singhal Published: 1989.*
Towards Efficient Algorithms for Deadlock Detection and Resolution in Distributed Systems ShouHan Wang Published: 1989.*
A Distributed Algorithm for Deadlock Detection and Resolution Don P. Mitchell and Michael J. Merritt Published: 1984.*
Scalable Reader-Writer Synchronization for Shared-Memory Multiprocessors John M. Mellor-Crummey and Michael L. Scottt Published: 1991.*
Informing Algorithms for Efficient Scheduling of Synchronizing Threads on Multiprogrammed SMPs Christos D. Antonopoulos, Dimitrios S. Nikolopoulos, and Theodore S. Papatheodorou Published: 2001.*
Assembly instructions for Infrared transmitter module Published: Jun. 8, 2013 Retrieved Jan. 27, 2014 from: http://www.buildcircuit.com/assembly-instructions-for-infrared-transmitter-module/.*
Oracle Berkeley DB Java Edition—Getting Started with Transaction Processing Oracle p. 17-23 Published: Dec. 5, 2006.*
System Deadlocks E. G. Coffman, Jr., M. J. Elphick, and A. Shoshani Published: 1971.*
EE442 Operating Systems notes, "Chapter 5—Deadlocks" Ugur HALICI Published: 2005.*
"Introduction to Embedded Systems", Shibu K.V. p. 446, Published: 2009.*
Lock—Definition Margaret Rouse Techtarget.com Published: 2005.*
Database System Implementation Hector Garcia-Molina Jeffrey D. Ullman Jennifer Widom p. 559-561 Published: 1999.*
Blocking vs. Deadlocking . . . do you know the difference? Colin Stasiuk Published: Mar. 16, 2009.*
Blocking is not Deadlocking Dan Guzman Published: 2008.*
Introduction to Operating Systems Dr. Richard S. Hall and Torsten Fink Published 2001.*
2006 Edsger W. Dijkstra Prize in Distributed Computing Dahlia Malkhi Yoram Moses Michel Raynal Nir Shavit Jul. 3, 2006.*
Chapter 6—"Locking" (revised) of Principles of Transaction Processing for the System Professional Philip A. Bernstein and Eric Newcomer Retrieved from: https://courses.cs.washington.edu/courses/csep545/01wi/lectures/Chapt6V3.pdf Published 2001.*
Berkeley DB Reference Guide Sleepycat Software Chapter 1-3: "What is Berkeley DB?"; and Chapter 14: "Locking Subsystem" Published: 2002.*
Forum thread: "Recovery from deadlock in a read-only cursor" User "555776" identified by handle "Arkadiy" et al. Retrieved from: https://community.oracle.com/thread/464349 Published 2007.*
The Berkeley DB Book Himanshu Yadava p. 66-67 Published 2007.*
SESAM/SQL-Server V4.0A (BS2000/OSD) Core Manual Fujitsu pp. 105 and 189 Published: 2006.*
United States Patent and Trademark Office, Office Action for U.S. Appl. No. 13/716,108, Aug. 28, 2014, pp. 1-22, Alexandria, VA, USA.
Paul Titheridge, Using JMS connection pooling with WebSphere Application Server and WebSphere MQ, Part 2, Article, Sep. 26, 2007, pp. 1-11, IBM Corporation, Published online at: http://www.ibm.com/developerworks/websphere/library/techarticles/0709_titheridge/0709_titheridge.html.
United States Patent and Trademark Office, Notice of Allowance for U.S. Appl. No. 13/716,108, Mar. 31, 2015, pp. 1-18, Alexandria, VA, USA.
United States Patent and Trademark Office, Office Action for U.S. Appl. No. 14/056,099, Feb. 19, 2016, pp. 1-36, Alexandria, VA, USA.

* cited by examiner

DEADLOCK AVOIDANCE

RELATED APPLICATIONS

This application claims priority to and claims the benefit of European Patent Application Serial No. EP09157645.4 titled "DEADLOCK AVOIDANCE," which was filed in the European Patent Office on Apr. 8, 2009, and which is incorporated herein by reference in its entirety.

BACKGROUND

This invention relates to a method of operating a transaction processing system, and to the transaction processing system itself. The invention may be used to provide deadlock avoidance for recoverable requests.

In computer science, transaction processing is a system of processing that is divided into indivisible units called transactions or tasks. Each transaction, or task, must succeed or fail as a complete unit. A transaction cannot remain in an intermediate state. Transaction processing is designed to maintain a computer system, such as a database, in a known and consistent state by ensuring that any operations in a transaction are either all completed successfully or all cancelled successfully. If some of the operations in a transaction are completed, but errors occur when another operation is attempted, the transaction processing system rolls back all of the operations of the transaction, including the successful ones, thereby removing all traces of the entire transaction and restoring the system to the consistent, known state that it was in before the processing of the transaction began. If all operations of a transaction are completed successfully, the transaction is committed by the system, and all changes are made permanent.

A known problem in transaction processing systems is deadlock. In some cases, two transactions may, in the course of their processing, attempt to access the same portion of a database at the same time, in a way that prevents them from proceeding. For example, transaction A may access portion X of the database, and transaction B may access portion Y of the database. If, at that point, transaction A then tries to access portion Y of the database while transaction B tries to access portion X, a deadlock may occur, and neither transaction may be completed. Transaction processing systems are designed to detect these deadlocks when they occur. Once way to resolve the problem is for both transactions to be cancelled and rolled back, and then they will be started again in a different order, automatically, so that the deadlock does not occur again. Alternatively, just one of the deadlocked transactions will be cancelled, rolled back, and automatically restarted after a short delay. Deadlocks may also occur between multiple transactions.

In a transaction processing environment multiple tasks may attempt to make multiple requests to several recoverable resources atomically. Exclusive use of a resource is used to ensure that only one task at a time has read/write access to a resource. Shared use of a resource is used to ensure that, when browsing through a sequential list of items, a task does not lose its position. Deadlocks may occur in this environment. These are normally resolved by aborting one of the two or more tasks involved in the deadlock. A self deadlock, where a single task becomes deadlocked with itself, through obtaining a shared lock on a resource and then later attempting an exclusive lock on the same resource, is also normally resolved in this way.

Aborting tasks may cause an integrity problem if the task (s) to be aborted, to break the deadlock, should not be aborted, for example if a task is in backout. Even if integrity is maintained, this method is still disruptive, and adds processing time to restarting the transactions from the beginning. A more robust and efficient method is needed to resolve deadlocks.

BRIEF SUMMARY

According to a first aspect of the present invention, there is provided a method of operating a transaction processing system, comprising locking, via a first task executing on a computing device, a first resource as a shared resource; attempting, via the first task, to lock a second resource as an exclusive resource; ascertaining that a deadlock has occurred; identifying a second task that wishes to use the locked first resource; storing a current position of the first task with respect to the first resource; removing the lock on the first resource; prompting the second task to use the first resource; locking, via the first task, the first resource as the shared resource: repositioning the first task with respect to the first resource according to the stored position; locking, via the first task, the second resource as the exclusive resource; and performing the first task.

According to a second aspect of the present invention, there is provided a transaction processing system comprising a memory; and a processor programmed to: lock a first resource as a shared resource in association with execution of a first task; attempt to lock a second resource as an exclusive resource in association with execution of the first task; ascertain that a deadlock has occurred; identify a second task that wishes to use the locked first resource; store a current position of the first task with respect to the first resource; remove the lock on the first resource; prompt the second task to use the first resource; lock the first resource as the shared resource in association with execution of the first task; reposition the first task with respect to the first resource according to the stored position; lock the second resource as the exclusive resource in association with execution of the first task; and perform the first task.

According to a third aspect of the present invention, there is provided a computer program product comprising a computer readable storage medium including computer readable program code, where the computer readable program code when executed on a computer causes the computer lock, via a first task, a first resource as a shared resource; attempt, via the first task, to lock a second resource as an exclusive resource; ascertain that a deadlock has occurred; identify a second task that wishes to use the locked first resource; store a current position of the first task with respect to the first resource; remove the lock on the first resource; prompt the second task to use the first resource; lock, via the first task, the first resource as the shared resource; reposition the first task with respect to the first resource according to the stored position; lock, via the first task, the second resource as the exclusive resource; and perform the first task.

BRIEF DESCRIPTION OF THE SEVERAL VIEWS OF THE DRAWINGS

Embodiments of the present invention will now be described, by way of example only, with reference to the accompanying drawings, in which.

DETAILED DESCRIPTION

Figure 1:
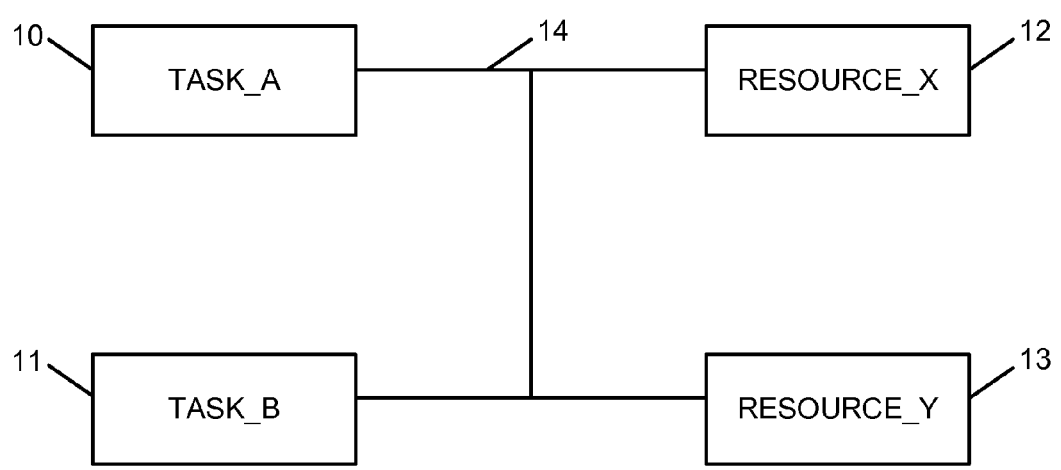
FIG. 1 is a schematic diagram of an example of an implementation of a transaction processing system according to an embodiment of the present subject matter.

Owing to the invention, it is possible to provide a new method of avoiding deadlocks in which the task that detects the deadlock will also detect the blocking resource and have the task holding that resource release the resource in a non-disruptive manner, rather than abort, to break the deadlock. This results in a transaction processing system that may resolve deadlocks involving shared resources more efficiently than is currently possible and is less disruptive, as no transactions are aborted. One of the tasks in the deadlock will pause, noting its position relative to the shared resource, and will prompt the other task to retry. When the first task restarts, it will do so from the correct position within the shared resource.

An example of the deadlock resolution is as follows, illustrating the case involving two deadlocked tasks A and B and two resources X and Y. Task A issues a browse request that obtains shared use of the resource containing item X. Task B issues a browse request that obtains shared use of the resource containing item Y. Task B tries to get an exclusive use of the resource containing item X. This fails with a report saying task A has the resource, and so task B must wait for task A to release the resource. Task A tries to obtain exclusive use of the resource containing item Y. This fails with a report saying task B has the resource. A deadlock has now occurred. The task that detects the deadlock (e.g., task A) may resolve this by identifying a second task (e.g., task B) that wishes to use the locked first resource, releasing the shared use of the resource containing item X, and prompting the second task to use the resource containing item X. This allows task B to retry and obtain exclusive use of the resource containing item X. Task B continues and eventually releases the shared use of the resource containing item Y. This allows task A to obtain exclusive use of the resource containing item Y. Task A may resume its browse. It notes that its cursor position has been lost and so needs to be re-established. This then allows the browse to continue as though it had not been interrupted.

Preferably, the method further comprises waiting a defined period of time, after the prompting of the second task, before locking the first resource, as a shared resource, by the first task (e.g., locking, via the first task, the first resource as a shared resource in response to expiration of the defined period of time). The transaction processing system may be configured so that the first task (task A in the example above) will wait a predefined period of time before restarting its work again. This will give the other task, which was deadlocked by the first task's lock on the shared resource, time to complete its work and ensure that the deadlock does not arise again immediately. Instead of waiting for a defined period of time, as in this implementation, an alternative would be to give the second task a higher priority, so that it is scheduled before the first task.

Advantageously, the step of removing the lock on the first resource further comprises removing locks on all shared resources locked by the first task. In this case, the method further comprises storing the current position of the first task with respect to all of shared resources locked by the first task, and after repositioning the first task with respect to the first resource according to the stored position, repositioning the first task with respect to all of the shared resources locked by the first task. The task that discovers the deadlock (task A in the example above) may have multiple shared resources that are locked, and each one of these resources may be released, with the current position of the browse by task A stored, so that when task A restarts, the task may reposition itself correctly with respect to each of these shared resources.

In one embodiment, the step of identifying a second task that wishes to use the locked first resource comprises identifying that the second task is the first task. The methodology executed by the transaction processing system is such that self-deadlocks may be detected and corrected using the same principles. The task that discovers the deadlock may be trying to establish an exclusive lock on a resource to which it already has a shared lock, and the process will efficiently and effectively resolve this situation.

FIG. 1 is a schematic diagram of an example of an implementation of a transaction processing system at a logical level. It is understood that components, such as processors, memory, and other components are not illustrated for ease of illustration purposes. Task_A 10 and task_B 11 connect to either a local resource_X 12 or a remote resource_Y 13 via a network connection 14. Each of the task_A 10 and the task_B 11 includes a transaction within the concept of transaction processing. This means that all of the operations within either task must either all fail or all succeed, this being the principle that a task is atomic. For example, an overall task may be that an individual has transferred some money from a current account to a savings account within an online banking service. The task would represent the debiting of the money from the current account and the crediting of the same money to the savings account. As such, it may be seen that the entire task must succeed or fail, because if one operation succeeded and the other failed, an inconsistency would be created. The resource_X 12 and the resource_Y 13 may be considered to be the relevant account records stored within a database.

Note that the physical location of the tasks 10 and 11 and the resources 12 and 13 is not material. A single server may be executing the tasks 10 and 11 and also storing the resources 12 and 13. Alternatively, various processing (e.g., processors) and storage (e.g., memory) components within a system may be distributed at different locations, even in different continents. The network connection 14 may be local buses within a server or may be local networks such as an Intranet or may include a wide area network, such as the Internet. The system may also include other components, such as a database management system, that is responsible for administration of the overall system.

If one of the tasks 10 or 11 needs to access a resource 12 or 13 for the purpose of changing that resource, for example by updating the resource 12 or 13 as part of a transaction, then the respective task 10 or 11 will need to acquire an exclusive lock on the respective resource in order to stop any other task from performing any read or write on the resource, until all of the operations associated with the task in the current transaction have completed and the lock may be released. Similarly, if one of the tasks 10 or 11 needs to access a resource 12 or 13 for the purpose of browsing that resource, then the respective task 10 or 11 will need to acquire a shared lock on the respective resource, which will allow other tasks to also share that resource, but will not allow another task to put an exclusive lock on the same resource. As has been discussed above, a problem with transaction processing systems is that deadlocks may occur when different tasks, such as the task_A 10 and the task_B 11, are conflicting over the same resources 12 or 13. If two such tasks lock out respective resources that the other task needs, then neither task may complete as both are waiting for a lock created by the other task to be released, while the relevant lock is being held by a task that is also stalled by a lock. This situation is a deadlock. Multiple such tasks may be caught in a deadlock situation if a chain of locks has been created that effectively create a circle back to the same task. Each such task is waiting for a lock to be released on a respective resource.

Figure 2:
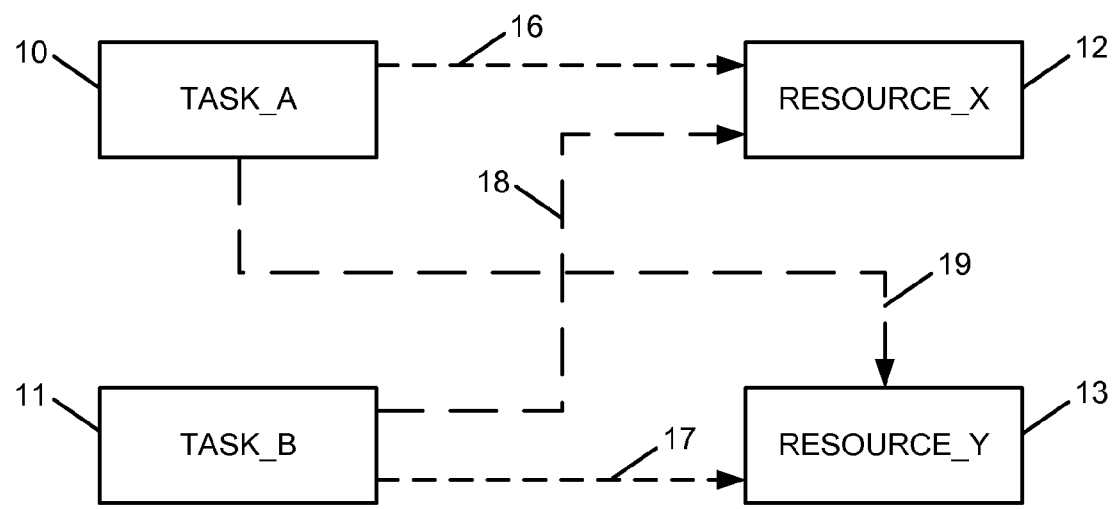
FIG. 2 is a schematic diagram of an example of an implementation of the transaction processing system of FIG. 1 and illustrates an example of deadlock occurrence and the resolution of the deadlock according to an embodiment of the present subject matter.

FIG. 2 is a schematic diagram of an example of an implementation of the transaction processing system of FIG. 1 and illustrates an example of deadlock occurrence and the resolution of the deadlock. This Figure shows the same configuration of tasks 10 and 11 and resources 12 and 13 as FIG. 1, illustrating the case involving two deadlocked tasks, the task_A 10 and the task_B 11, and two resources, the resource_X 12 and the resource_Y 13. Task_A 10 issues a browse request 16 that gets shared use of the resource_X 12. Likewise, task_B 11 issues a browse request 17 that gets shared use of the resource_Y 13. Task_B 11 tries to obtain exclusive use of the resource_X 12, shown as the request 18. This fails with a report indicating that task_A 10 has a lock on the resource_X 12, and so the task_B 11 must wait for task_A 10 to release the resource_X 12.

Task_A 10 tries to obtain exclusive use of the resource_Y 13, shown as the request 19. This also fails with a report indicating that task_B 11 has the lock on the resource_Y 13. A deadlock has now occurred, as neither task may take any action. The task that detects the deadlock (e.g., task_A 10) may resolve this by releasing the shared use lock of the resource_X 12. This allows task_B 11 to retry and obtain exclusive use of the resource_X 12. Task_B 11 then continues and eventually releases the shared use lock of the resource_Y 13. This allows task_A 10 to obtain exclusive use of the resource_Y 13. Eventually task_A 10 will resume its browse. It notes that its cursor position has been lost and so needs to be re-established. This then allows the browse of the resource_X 12 to continue as though it had not been interrupted. The deadlock that occurred in relation to the operation of the two tasks, task_A 10 and task_B 11, has been resolved in an efficient manner.

The process may also be used to solve problems relating to self deadlock. This occurs when a task (e.g., task_A 10) creates its own deadlock. This may happen, for example, when the task_A 10 issues a browse request that obtains shared use of the resource_X 12. The task_A 10 then tries to obtain exclusive use of the same resource_X 12. This fails with a report indicating that the task_A 10 has the resource_X 12 itself. A deadlock has now occurred. The task_A 10 may resolve this by noting the position of existing requests, so that the task_A 10 may reposition later, releasing all shared use of resource_X 12 owned by the browse request, allowing the task_A 10 to proceed with the exclusive request and when the browse is resumed, the task_A 10 may reposition its requests and retry.

Similarly when two such tasks are deadlocked, by a first task browsing on a resource, such as the resource_X 12, first, the processing described herein may resolve the issue. For example, task_A 10 issues a browse request that obtains shared use of the resource_X 12 and the task_B 11 issues a browse request that obtains shared use of a resource_Y 13. If task_B 11 tries to obtain exclusive use of the resource_X 12, this fails with a report indicating that task_A 10 has the resource_X 12, and so this task_B 11 must wait for task_A 10 to release the resource_X 12. If task_A 10 then tries to get an exclusive use of the resource_Y 13, this fails with a report indicating that task_B 11 has the resource_Y 13. A deadlock has now occurred. The respective task that detects the deadlock (e.g., task_A 10) may resolve this by noting the position of existing requests, so that the task_A 10 may reposition later, releasing all shared use of the resource_X 12 owned by task_A 10, and allowing the other task_B 11 to proceed. Task_B 11 will now be able to get its exclusive use of the resource_X 12, complete its requests and release its shared use of the resource_Y 13. When task_A 10 is resumed it may reposition its requests and retry.

Figure 3:
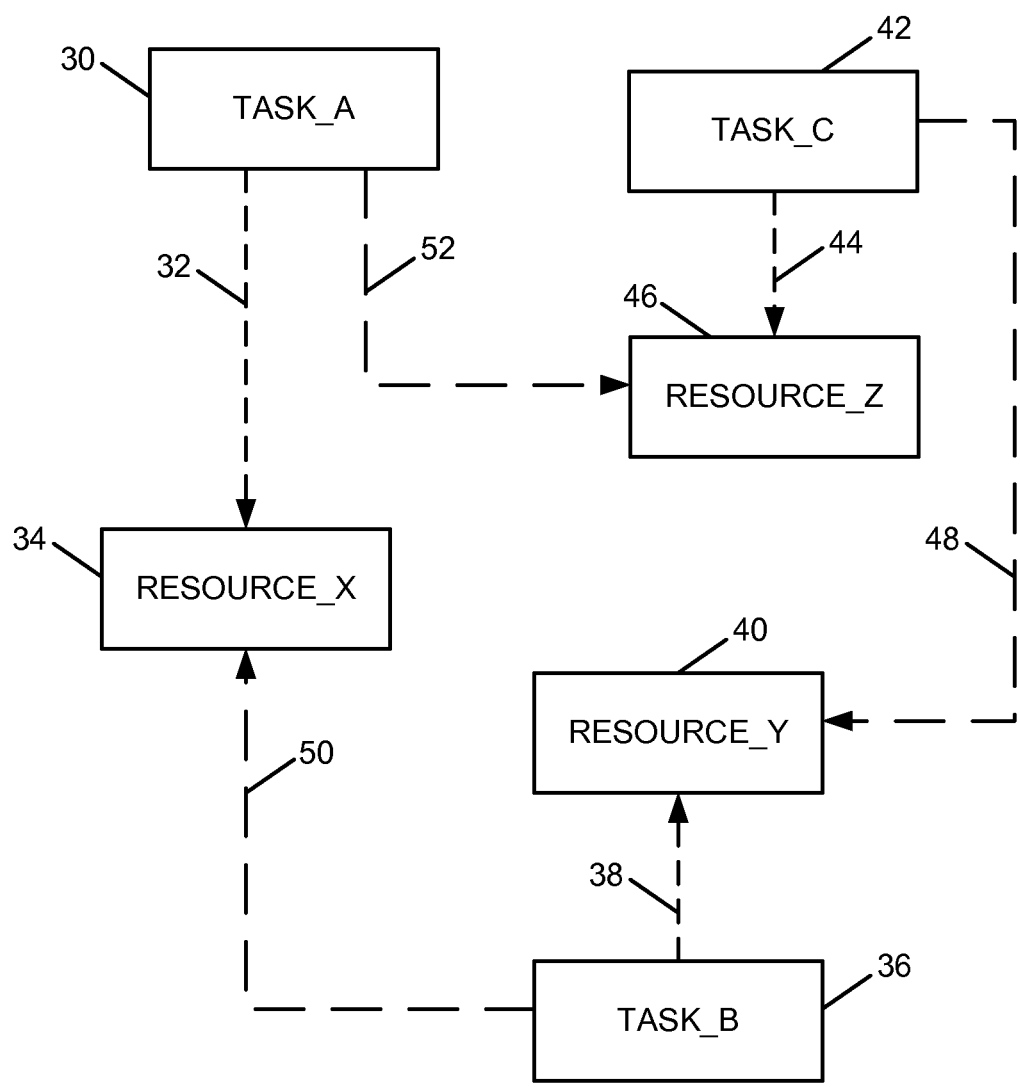
FIG. 3 is a schematic diagram of an example of an implementation of a second transaction processing system illustrating multiple tasks deadlocked according to an embodiment of the present subject matter.

FIG. 3 is a schematic diagram of an example of an implementation of a second transaction processing system illustrating multiple tasks deadlocked. A task_A 30 issues a browse request 32 that obtains shared use of a resource_X 34. A task_B 36 issues a browse request 38 that obtains shared use of a resource_Y 40. A task_C 42 issues a browse request 44 that obtains shared use of a resource_Z 46. Task_C 42 also tries to obtain exclusive use 48 of the resource_Y 40. This fails with a report indicating that task_B 36 has the resource_Y 40, and so task_C 42 must wait for task_B 36 to release the resource_Y 40. Task_B 36 tries to obtain exclusive use 50 of the resource_X 34. Again this fails with a report indicating that task_A 30 has the resource_X 34, and so task_B 36 must wait for task_A 30 to release the resource_X 34. Meanwhile, task_A 30 tries to obtain exclusive use 52 of the resource_Z 46. This fails with a report indicating that task_C 42 has the resource_Z 46. A deadlock has now occurred.

The task that detects the deadlock (e.g., task_A 30) may resolve this by noting the position of the existing browse request, so that it may reposition later, and by releasing all shared use of resources owned by the task_A 30 (e.g., the resource_X 34). This will allow task_B 36 to continue. When task_B 36 continues it will be able to obtain its exclusive use of the resource_X 34, complete its request and release its shared use of the resource_Y 40. This will allow task_C 42 to continue. When task_C 42 continues it will be able to obtain its exclusive use of the resource_Y 40 and complete its request and release its shared use of the resource_Z 46. When task_A 30 is resumed, it may reposition its requests and retry. In this way the deadlock will be resolved, with the respective task that discovers the deadlock (e.g., task_A 30) releasing its lock and prompting the task that required the resource (e.g., resource_X 34) to retry its request on the resource.

Figure 4A:
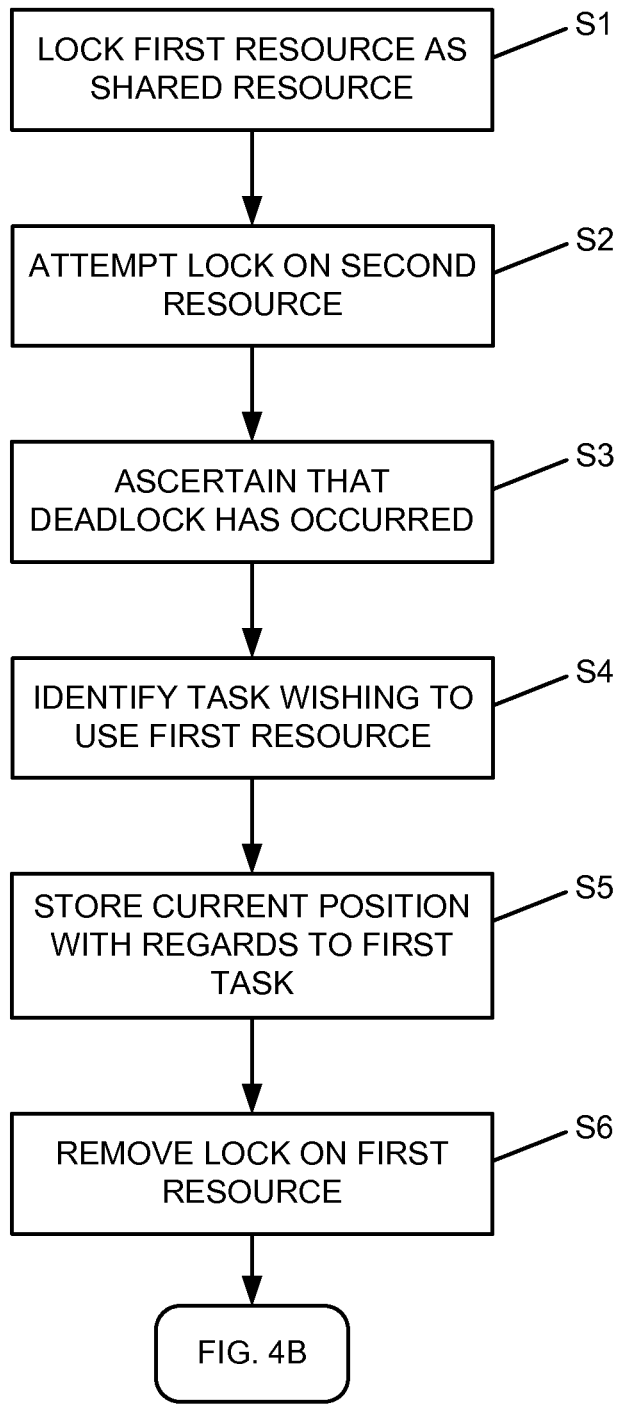
FIG. 4A is a first portion of a flow diagram of an example of an implementation of a method of operating a transaction processing system according to an embodiment of the present subject matter.
Figure 4B:
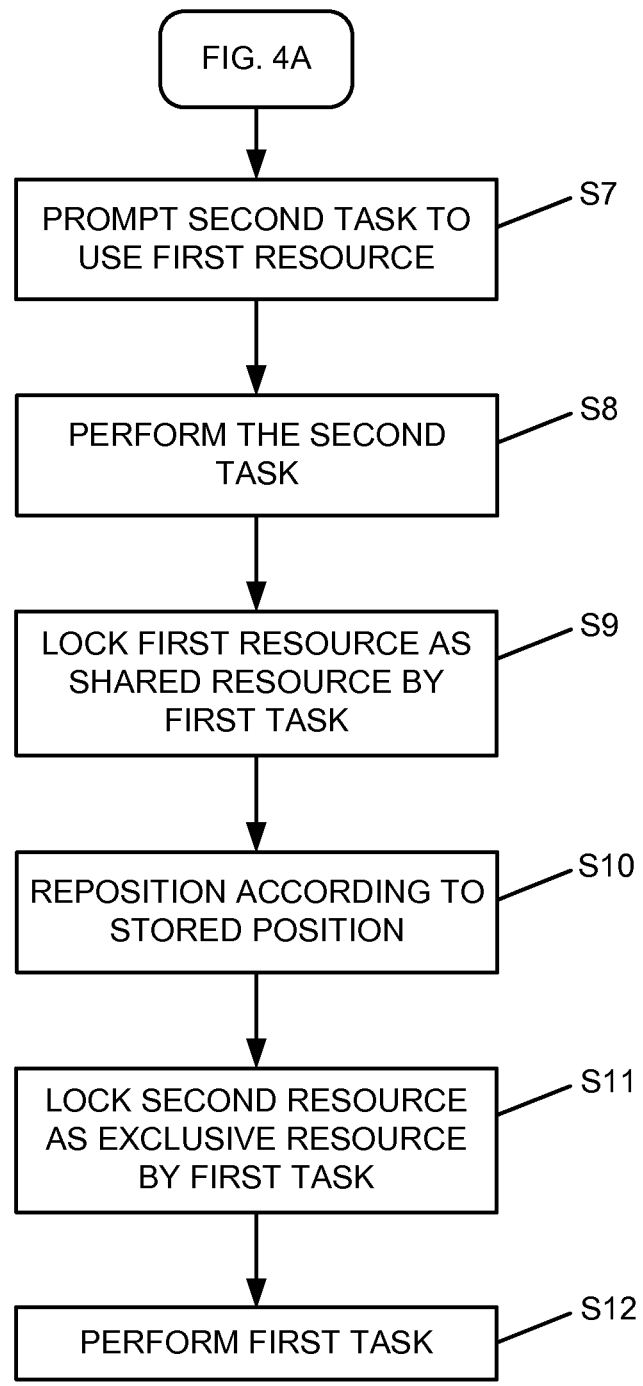
FIG. 4B is a second portion of a flow diagram of an example of an implementation of a method of operating a transaction processing system according to an embodiment of the present subject matter.

The generalized processing is summarized in FIGS. 4A and 4B. FIG. 4A is a first portion of a flow diagram of an example of an implementation of a method of operating a transaction processing system, in which the system comprises a plurality of tasks and a plurality of resources. Reference is made to the tasks and resources of FIG. 1 and FIG. 3 for ease of description purposes. The method 400 includes the steps of (step S1), locking a first resource_X 12, as a shared resource, by a first task_A 10 and (step S2) attempting to lock a second resource_Y 13, as an exclusive resource, by the first task_A 10. The first task_A 10 will then ascertain that a deadlock has occurred, (step S3) and identify that a second task_B 11 wishes to use the locked first resource_X 12, (step S4).

Once a deadlock has been determined, the first task_A 10 will store the current position of the first task_A 10 with respect to the first resource_X 12 (step S5) and remove the lock on the first resource_X 12 (step S6). Processing continues with FIG. 4B.

FIG. 4B is a second portion of a flow diagram of an example of an implementation of a method of operating a transaction processing system. The cause of the deadlock is now removed, and process continues by the first task_A 10 prompting the second task_B 11 to use the first resource_X 12 in (step S7). The system performs the second task_B 11 (step S8). When it is resumed, the first task_A 10 locks the first resource_X 12, as a shared resource (step S9), repositions itself with respect to the first resource_X 12 according to the stored position (step S10), locks the second resource_Y 13, as an exclusive resource (step S11), and finally performs the first task_A 10 (step S12).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of operating a transaction processing system, comprising:

by a first task executing within the transaction processing system on a computing device:
issuing a first browse request within the transaction processing system that locks a first resource as a shared resource using a shared lock;
issuing a first exclusive use request within the transaction processing system that attempts to lock a second resource as an exclusive resource using an exclusive lock, where the first exclusive use request fails with a first failure report saying that a second task identified within the first failure report has the second resource locked and that the first task must wait for the second task to release the second resource;
ascertaining, in conjunction with the second task issuing a different exclusive use request within the transaction processing system that attempts to obtain exclusive use of the first resource that also fails with a second failure report saying that the first task identified within the second failure report has the first resource locked and that the second task must wait for the first task to release the first resource, that a deadlock has occurred; and
responsive to the first task ascertaining that the deadlock has occurred in conjunction with the second failure report saying that the first task has the first resource locked within the transaction processing system and that the second task must wait for the first task to release the first resource, the first task within the transaction processing system:
pausing its browse of the first resource;
identifying, in association with the second failure report saying that the second task must wait for the first task to release the first resource, the second task that wishes to exclusively use the locked first resource that is locked as the shared resource using the shared lock;
storing its current browse position of the first browse request with respect to the first resource;
removing the shared lock on the first resource;
prompting the second task to retry its different exclusive use request within the transaction processing system to obtain the exclusive use of the first resource;
locking, after the second task releases the exclusive use of the first resource, the first resource again as the shared resource using the shared lock where the first task resumes the first browse request;
repositioning itself with respect to the first resource according to the stored current browse position of the first browse request;
issuing a second exclusive use request within the transaction processing system that locks the second resource as the exclusive resource using the exclusive lock; and
performing the first task using the locked first resource and the locked second resource;
where the first task ensures that neither the first task nor the second task is aborted as a result of the deadlock.

2. The method according to claim 1, where, in response to prompting the second task to retry its different exclusive use request within the transaction processing system to obtain the exclusive use of the first resource, the first task waiting a defined period of time before attempting to lock the first resource again as the shared resource to resume the first browse request, and where the first task locking, after the second task releases the exclusive use of the first resource, the first resource again as the shared resource using the shared lock comprises the first task locking the first resource again as the shared resource using the shared lock in response to expiration of the defined period of time.

3. The method according to claim 1, further comprising the first task assigning a higher priority to the second task.

4. The method according to claim 1, where removing the shared lock on the first resource comprises removing shared locks on all shared resources locked by the first task using the shared locks.

5. The method according to claim 1, where the first task storing its current browse position of the first browse request with respect to the first resource comprises the first task storing its current browse position with respect to all shared resources locked by the first task using shared locks.

6. The method according to claim 5, where the first task repositioning itself with respect to the first resource according to the stored current browse position of the first browse request comprises the first task repositioning itself with respect to all of the shared resources locked by the first task using the shared locks.

7. The method according to claim 1, where the first task identifying the second task that wishes to exclusively use the first resource that is locked as the shared resource comprises the first task determining that the second task comprises the first task.

8. A transaction processing system, comprising:
a memory; and
a processor programmed to:
  execute a first task within the transaction processing system to:
    issue a first browse request within the transaction processing system that locks a first resource as a shared resource using a shared lock;
    issue a first exclusive use request within the transaction processing system that attempts to lock a second resource as an exclusive resource using an exclusive lock, where the first exclusive use request fails with a first failure report saying that a second task identified within the first failure report has the second resource locked and that the first task must wait for the second task to release the second resource;
    ascertain, in conjunction with the second task issuing a different exclusive use request within the transaction processing system that attempts to obtain exclusive use of the first resource that also fails with a second failure report saying that the first task identified within the second failure report has the first resource locked and that the second task must wait for the first task to release the first resource, that a deadlock has occurred; and
    responsive to the first task ascertaining that the deadlock has occurred in conjunction with the second failure report saying that the first task has the first resource locked within the transaction processing system and that the second task must wait for the first task to release the first resource, the first task executing to:
      pause its browse of the first resource;
      identify in association with the second failure report saying that the second task must wait for the first task to release the first resource, the second task that wishes to exclusively use the first resource that is locked as the shared resource using the shared lock;
      store its current browse position of the first browse request with respect to the first resource;
      remove the shared lock on the first resource;
      prompt the second task to retry its different exclusive use request within the transaction processing system to obtain the exclusive use of the first resource;
      lock, after the second task releases the exclusive use of the first resource, the first resource again as the shared resource using the shared lock, where the first task resumes the first browse request;
      reposition itself with respect to the first resource according to the stored current browse position of the first browse request;
      issue a second exclusive use request within the transaction processing system that locks the second resource as the exclusive resource using the exclusive lock; and
      perform the first task using the locked first resource and the locked second resource;
    where the first task ensures that neither the first task nor the second task is aborted as a result of the deadlock.

9. The system according to claim 8, where in response to the first task executing to prompt the second task to retry its different exclusive use request within the transaction processing system to obtain the exclusive use of the first resource, the first task executes to wait a defined period of time before attempting to lock the first resource again as the shared resource to resume the first browse request, and where, in executing to lock, after the second task releases the exclusive use of the first resource, the first resource again as the shared resource using the shared lock, the first task executes to lock the first resource again as the shared resource using the shared lock in response to expiration of the defined period of time.

10. The system according to claim 8, where the first task executes to assign a higher priority to the second task.

11. The system according to claim 8, where, in executing to remove the shared lock on the first resource, the first task executes to remove shared locks on all shared resources locked by the first task using the shared locks.

12. The system according to claim 8, where, in executing to store its current browse position of the first browse request with respect to the first resource, the first task executes to store its current browse position with respect to all shared resources locked by the first task using shared locks.

13. The system according to claim 12, where, executing to reposition itself with respect to the first resource according to the stored current browse position of the first browse request, the first task executes to reposition itself with respect to all of the shared resources locked by the first task using the shared locks.

14. The system according to claim 8, where, in executing to identify the second task that wishes to exclusively use the first resource that is locked as the shared resource, the first task executes to determine that the second task comprises the first task.

15. A computer program product comprising a non-transitory computer readable storage medium including computer readable program code, where the computer readable program code when executed on a computer causes the computer to:
  by a first task executing within a transaction processing system on the computer:
    issue a first browse request within the transaction processing system that locks a first resource as a shared resource using a shared lock;
    issue a first exclusive use request within the transaction processing system that attempts to lock a second resource as an exclusive resource using an exclusive lock, where the first exclusive use request fails with a first failure report saying that a second task identified within the first failure report has the second resource locked and that the first task must wait for the second task to release the second resource;
    ascertain, in conjunction with the second task issuing a different exclusive use request within the transaction processing system that attempts to obtain exclusive use of the first resource that also fails with a second failure report saying that the first task identified within the second failure report has the first resource locked and that the second task must wait for the first task to release the first resource, that a deadlock has occurred; and responsive to the first task ascertaining that the deadlock has occurred in conjunction with the second failure report saying that the first task has the first resource locked within the transaction processing system and that the second task must wait for the first task to release the first resource, the first task executing on the computer to:

pause its browse of the first resource;

identify, in association with the second failure report saying that the second task must wait for the first task to release the first resource, the second task that wishes to exclusively use the first resource that is locked as the shared resource using the shared lock;

store its current browse position of the first browse request with respect to the first resource;

remove the shared lock on the first resource;

prompt the second task to retry its different exclusive use request within the transaction processing system to obtain the exclusive use of the first resource;

lock, after the second task releases the exclusive use of the first resource, the first resource again as the shared resource using the shared lock, where the first task resumes the first browse request;

reposition itself with respect to the first resource according to the stored current browse position of the first browse request;

issue a second exclusive use request within the transaction processing system that locks the second resource as the exclusive resource using the exclusive lock; and perform the first task using the locked first resource and the locked second resource;

where the first task ensures that neither the first task nor the second task is aborted as a result of the deadlock.

16. The computer program product according to claim 15, where:

in response to prompting the second task to retry its different exclusive use request within the transaction processing system to obtain the exclusive use of the first resource, the computer readable program code causes the first task executing on the computer to wait a defined period of time before attempting to lock the first resource again as the shared resource to resume the first browse request; and where, in causing the first task to execute to lock, after the second task releases the exclusive use of the first resource, the first resource again as the shared resource, the computer readable program code when executed on the computer causes the computer to execute the first task to lock the first resource again as the shared resource using the shared lock in response to expiration of the defined period of time.

17. The computer program product according to claim 15, where, in causing the first task to execute to remove the shared lock on the first resource, the computer readable program code when executed on the computer causes the computer to execute the first task to remove shared locks on all shared resources locked by the first task using the shared locks.

18. The computer program product according to claim 15, where, in causing the first task to execute to store its current browse position of the first browse request with respect to the first resource, the computer readable program code when executed on the computer causes the computer to execute the first task to store its current browse position with respect to all shared resources locked by the first task using shared locks.

19. The computer program product according to claim 18, where, in causing the first task to execute to reposition itself with respect to the first resource according to the stored current browse position of the first browse request, the computer readable program code when executed on the computer causes the computer to execute the first task to reposition itself with respect to all of the shared resources locked by the first task using the shared locks.

20. The computer program product according to claim 15, where, in causing the first task to execute to identify the second task that wishes to exclusively use the first resource that is locked as the shared resource, the computer readable program code when executed on the computer causes the computer to execute the first task to determine that the second task comprises the first task.

* * * * *